US008958388B2

(12) United States Patent
Mazzarese et al.

(10) Patent No.: US 8,958,388 B2
(45) Date of Patent: Feb. 17, 2015

(54) SYSTEM AND METHOD FOR MEASURING CHANNEL STATE INFORMATION IN A COMMUNICATIONS SYSTEM

(75) Inventors: David Jean-Marie Mazzarese, Beijing (CN); Yang Tang, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 379 days.

(21) Appl. No.: 13/295,985

(22) Filed: Nov. 14, 2011

(65) Prior Publication Data

US 2012/0120910 A1 May 17, 2012

Related U.S. Application Data

(60) Provisional application No. 61/413,808, filed on Nov. 15, 2010.

(51) Int. Cl.
*H04W 4/00* (2009.01)
*H04L 5/00* (2006.01)
*H04W 72/08* (2009.01)
*H04W 16/10* (2009.01)

(52) U.S. Cl.
CPC ............ *H04L 5/0092* (2013.01); *H04L 5/0023* (2013.01); *H04L 5/0048* (2013.01); *H04W 72/082* (2013.01); *H04W 16/10* (2013.01)
USPC ......................................................... 370/330

(58) Field of Classification Search
None
See application file for complete search history.

(56) References Cited

U.S. PATENT DOCUMENTS

| 8,038,968 | B2 | 10/2011 | Sorensen et al. |
| 2008/0232504 | A1 | 9/2008 | Ma et al. |
| 2009/0179797 | A1 | 7/2009 | Kwon et al. |
| 2009/0209264 | A1 | 8/2009 | Yang et al. |
| 2009/0252091 | A1 | 10/2009 | Tang et al. |
| 2009/0257423 | A1 | 10/2009 | Kwon et al. |
| 2010/0002797 | A1 | 1/2010 | Sanayei |
| 2010/0172316 | A1* | 7/2010 | Hwang et al. ................. 370/330 |
| 2010/0202548 | A1 | 8/2010 | Sanayei |

(Continued)

FOREIGN PATENT DOCUMENTS

CN 101873204 A 10/2010

OTHER PUBLICATIONS

PCT International Search Report and Written Opinion received in PCT Application No. PCT/CN2011/082212, mailed Feb. 23, 2012, 12 pages.

(Continued)

*Primary Examiner* — Suk Jin Kang
(74) *Attorney, Agent, or Firm* — Slater & Matsil, L.L.P.

(57) ABSTRACT

A method for operating a communications controller includes partitioning a full band signal selected from a set of orthogonal full band signals into a plurality of subband signals according to special signal frequency resource information of a special signal being transmitted by the communications controller in a manner that reduces or avoids a collision between the full band signal and the special signal, where the plurality of subband signals carries information for estimating a channel between the communications controller and a communications device. The method also includes assigning a subband associated with each subband signal in the plurality of subband signals to a respective subband time resource according to special signal time resource information of the special signal in a manner that reduces or avoids a collision between the subband and the special signal, where the assigned subband is part of a plurality of subbands.

25 Claims, 15 Drawing Sheets

(56) References Cited

U.S. PATENT DOCUMENTS

| | | | |
|---|---|---|---|
| 2010/0232525 A1 | 9/2010 | Xia et al. | |
| 2010/0246494 A1 | 9/2010 | Sanayei | |
| 2010/0265841 A1 | 10/2010 | Rong et al. | |
| 2011/0085457 A1* | 4/2011 | Chen et al. | 370/252 |
| 2011/0199986 A1* | 8/2011 | Fong et al. | 370/329 |
| 2011/0235743 A1* | 9/2011 | Lee et al. | 375/295 |
| 2011/0317624 A1* | 12/2011 | Luo et al. | 370/328 |
| 2012/0020230 A1* | 1/2012 | Chen et al. | 370/252 |
| 2012/0039298 A1* | 2/2012 | Lee et al. | 370/330 |
| 2012/0076024 A1* | 3/2012 | Ko et al. | 370/252 |
| 2012/0076028 A1* | 3/2012 | Ko et al. | 370/252 |
| 2012/0113816 A1* | 5/2012 | Bhattad et al. | 370/246 |
| 2012/0120842 A1* | 5/2012 | Kim et al. | 370/252 |
| 2012/0120903 A1* | 5/2012 | Kim et al. | 370/329 |
| 2012/0147773 A1* | 6/2012 | Kim et al. | 370/252 |
| 2012/0220327 A1* | 8/2012 | Lee et al. | 455/509 |
| 2012/0257531 A1* | 10/2012 | Ko et al. | 370/252 |
| 2013/0039203 A1* | 2/2013 | Fong et al. | 370/252 |
| 2013/0044685 A1* | 2/2013 | Fong et al. | 370/328 |
| 2013/0128813 A1* | 5/2013 | Yang et al. | 370/328 |
| 2013/0156125 A1* | 6/2013 | Ko et al. | 375/267 |
| 2013/0163461 A1* | 6/2013 | Kim et al. | 370/252 |
| 2013/0182789 A1* | 7/2013 | Ko et al. | 375/267 |
| 2013/0188591 A1* | 7/2013 | Ko et al. | 370/329 |
| 2013/0229985 A1* | 9/2013 | Kim et al. | 370/328 |

OTHER PUBLICATIONS

ZTE Corporation, "Considerations on CSI-RS Configuration Signaling," 3GPP TSG-RAN WG1 Meeting #62, R1-104554, Agenda Item 6.3.2.1, Madrid, Spain, Aug. 23-27, 2010, 8 pages.

ZTE Corporation, "CSI-RS Pattern Design for LTE-Advanced," 3GPP TSG-RAN WG1 Meeting #60, R1-100969, Agenda Item 7.2.2, San Francisco, USA, Feb. 22-26, 2010, 7 pages.

* cited by examiner

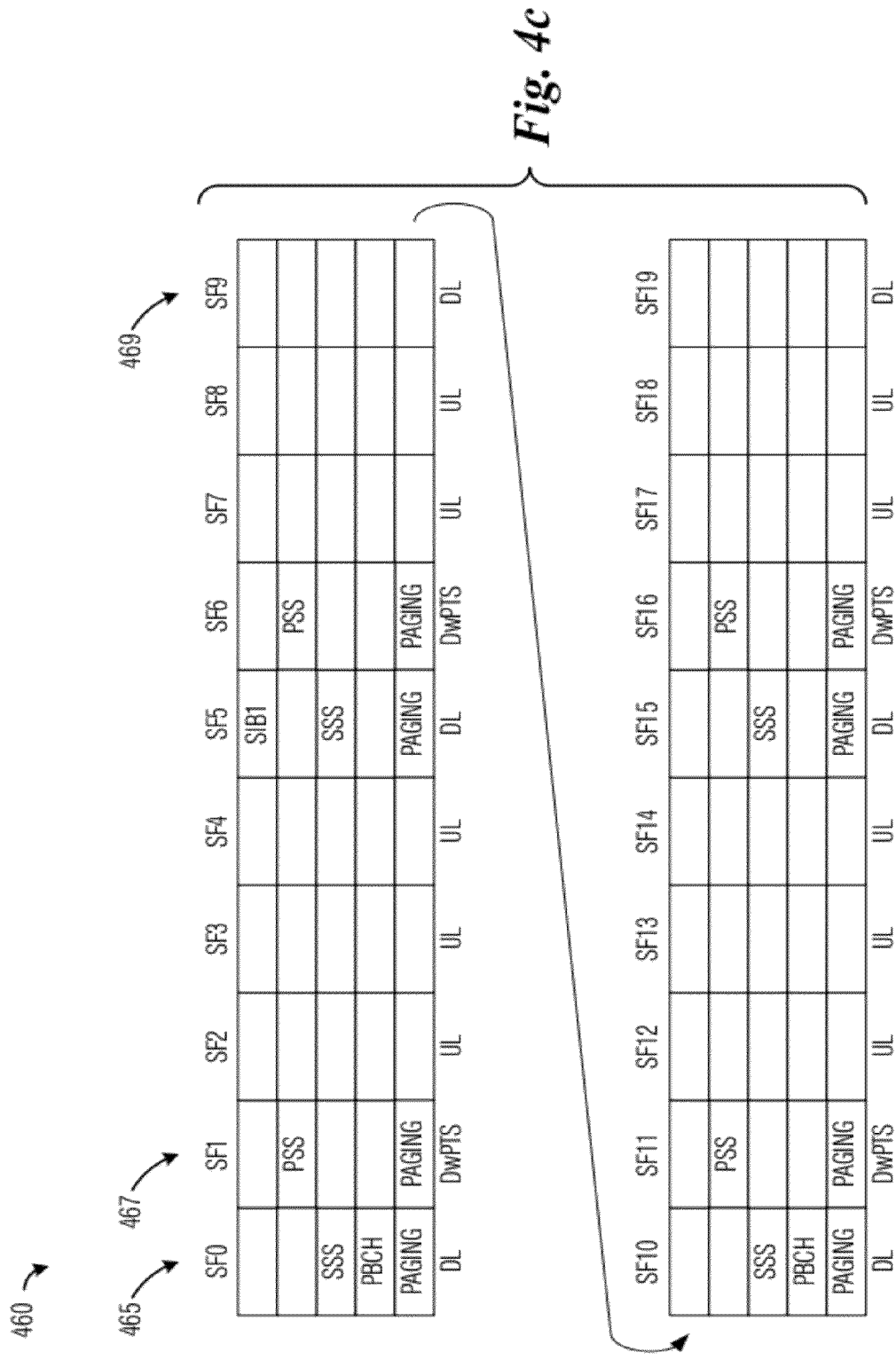

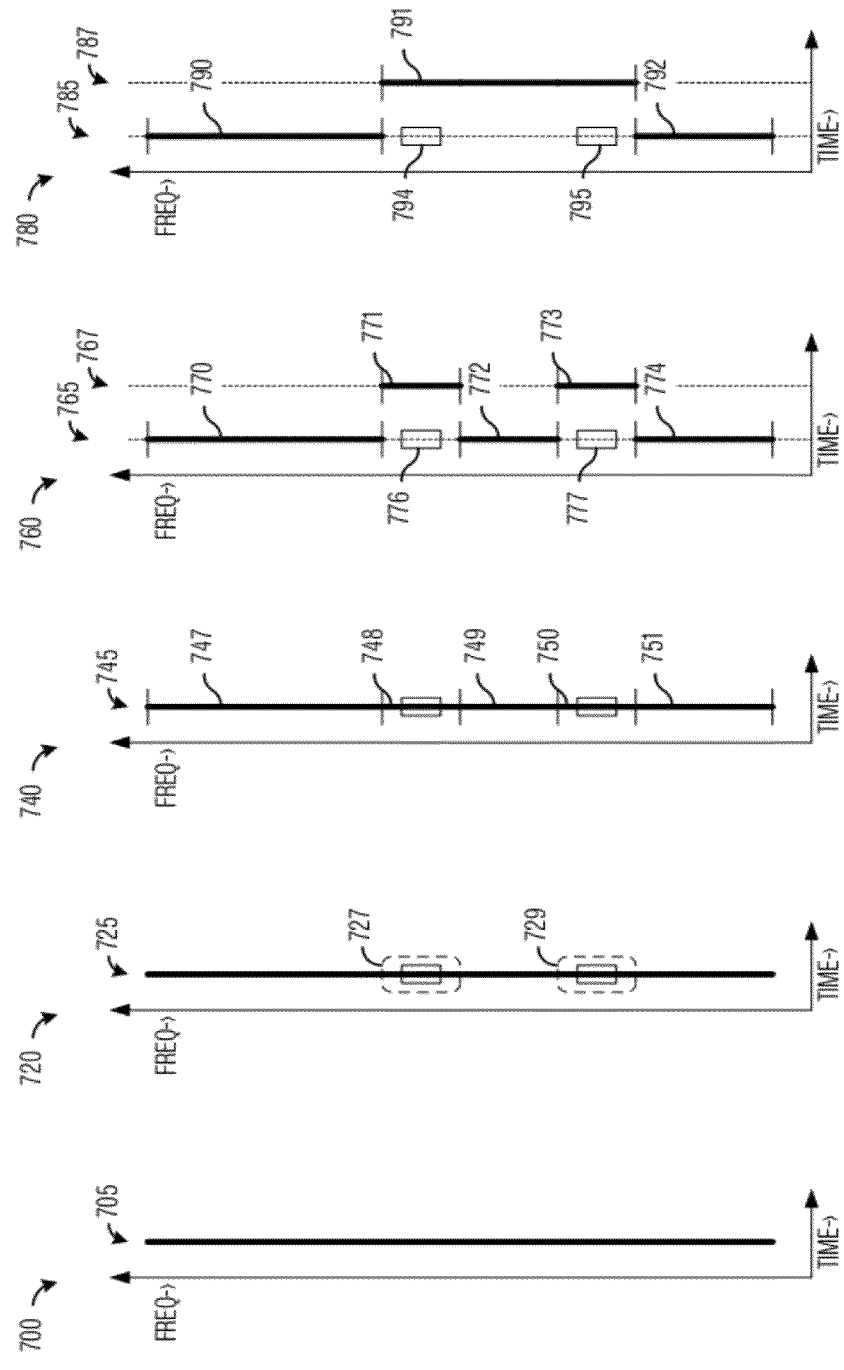

SYSTEM AND METHOD FOR MEASURING CHANNEL STATE INFORMATION IN A COMMUNICATIONS SYSTEM

This application claims the benefit of U.S. Provisional Application No. 61/413,808, filed on Nov. 15, 2010, entitled "Method for Measuring Channel State Information," which application is hereby incorporated herein by reference.

TECHNICAL FIELD

The present invention relates generally to digital communications, and more particularly to a system and method for measuring channel state information in a communications system.

BACKGROUND

In a communications system, the communications system's capacity may be significantly improved when an enhanced NodeB (eNB), also commonly referred to as a NodeB, base station (BS), communications controller, transmitter, and the like, has full or partial knowledge of a channel over which it will be transmitting. Information related to the channel may be referred to as channel state information (CSI). CSI may be obtained by the eNB over a reverse feedback channel. A user equipment (UE), also commonly referred to as a mobile station (MS), terminal, subscriber, user, and the like, that receives transmissions made by the eNB may transmit CSI to the eNB over the reverse feedback channel.

In general, the UE may make measurements of a channel between the eNB and itself in order to determine the CSI. The eNB may transmit signals to help the UE make the measurements. The signals may be referred to as CSI Reference Signals or CSI-RS.

SUMMARY OF THE INVENTION

Example embodiments of the present invention which provide a system and method for measuring channel state information in a communications system.

In accordance with an example embodiment of the present invention, a method for operating a communications controller is provided. The method includes partitioning a full band signal selected from a set of orthogonal full band signals into a plurality of subband signals according to special signal frequency resource information of a special signal being transmitted by the communications controller in a manner that reduces or avoids a collision with the full band signal and the special signal, where the plurality of subband signals carries information for estimating a channel between the communications controller and a communications device. The method also includes assigning a subband associated with each subband signal in the plurality of subband signals to a respective subband time resource according to special signal time resource information of the special signal in a manner that reduces or avoids a collision between the subband and the special signal, where the assigned subband is part of a plurality of subbands. The method further includes signaling subband frequency resource information and subband time resource information for the plurality of subbands to a communications device, and transmitting each subband signal in the plurality of subband signals in its respective subband to the communications device in its respective subband time resource.

In accordance with another example embodiment of the present invention, a method for operating a user equipment is provided. The method includes receiving, from a communications controller, subband time resource information and subband frequency resource information of a plurality of subbands associated with a plurality of subband signals partitioned from a full band signal selected from a set of orthogonal full band signals, wherein the full band signal is partitioned and the plurality of subband signals are assigned to respective time resources and frequency resources in a manner that reduces or avoids a collision with a special signal. The method also includes detecting, for each subband in the plurality of subbands, a transmitted subband signal transmitted in the subband at the respective subband's frequency resource and in the respective subband's time resource, thereby producing a plurality of detected transmitted subband signals, generating full band channel information for a channel between the communications controller and the user equipment according to the plurality of detected transmitted subband signals, and transmitting the full band channel information to the communications controller.

In accordance with another example embodiment of the present invention, a communications controller is provided. The communications controller includes a processor, and a transmitter coupled to the processor. The processor partitions a full band signal selected from a set of orthogonal full band signals into a plurality of subband signals according to special signal frequency resource information of a special signal being transmitted by the communications controller in a manner that reduces or avoids a collision between the full band signal and the special signal, where the plurality of subband signals carries information for estimating a channel between the communications controller and a communications device. The processor assigns a subband associated with each subband signal in the plurality of subband signals to a respective subband time resource according to special signal time resource information of the special signal in a manner that reduces or avoids a collision between the subband and the special signal, where the assigned subband is part of a plurality of subbands, and generates signals for subband frequency resource information and subband time resource information for the plurality of subbands The transmitter transmits the generated signals to the communications device, and transmits each subband signal in the plurality of subband signals in its respective subband to the communications device in its respective subband time resource.

In accordance with another example embodiment of the present invention, a user equipment is provided. The user equipment includes a receiver, a processor coupled to the receiver, and a transmitter coupled to the processor. The receiver receives, from a communications controller, subband time resource information and subband frequency resource information of a plurality of subbands associated with a plurality of subband signals partitioned from a full band signal selected from a set of orthogonal full band signals, wherein the full band signal is partitioned and the plurality of subband signals are assigned to respective time resources and frequency resources in a manner that reduces or avoids a collision with a special signal. The processor detects, for each subband in the plurality of subbands, a transmitted subband signal transmitted in the subband at the respective subband's frequency resource and in the respective subband's time resource, thereby producing a plurality of detected transmitted subband signals, and generates full band channel information for a channel between the communications controller and the user equipment according to the plurality of detected transmitted subband signals. The transmitter transmits the full band channel information to the communications controller.

One advantage of an embodiment is that CSI-RS intended to assist UE in measuring a communications channel may be sent with high periodicity so that the UE may determine up to date CSI to provide to the eNB. The up to date CSI may provide a more accurate indication of the channel, thereby improving communications system performance.

A further advantage of an embodiment is that a larger number of orthogonal CSI-RSs may be available for use. Therefore, a larger number of orthogonal CSI-RSs may be transmitted to the UEs without causing interference to each other. Furthermore, the larger number of orthogonal CSI-RSs may enable a larger number of eNBs or cells of eNBs to transmit orthogonal CSI-RSs without causing interference to close by eNBs or cells.

BRIEF DESCRIPTION OF THE DRAWINGS

For a more complete understanding of the present invention, and the advantages thereof, reference is now made to the following descriptions taken in conjunction with the accompanying drawing, in which:

FIGS. 4a through 4c illustrate example sequence of subframes for a number of central resource blocks in a communications system of different configurations according to example embodiments described herein;

FIGS. 7a through 7e illustrate example time-frequency diagrams highlighting a full band CSI-RS and the use of partitioning of the full band CSI-RS to avoid collisions according to example embodiments described herein;

DETAILED DESCRIPTION OF ILLUSTRATIVE EMBODIMENTS

The operating of the current example embodiments and the structure thereof are discussed in detail below. It should be appreciated, however, that the present invention provides many applicable inventive concepts that can be embodied in a wide variety of specific contexts. The specific embodiments discussed are merely illustrative of specific structures of the invention and ways to operate the invention, and do not limit the scope of the invention.

One embodiment of the invention relates to transmitting reference signals for use in measuring a channel. For example, in order to reduce or avoid collisions with synchronization signals and broadcast signals, an eNB partitions full band reference signals into multiple subbands and allocates the subbands for transmission at subframes where they will not collide with the synchronization signals (as well as the broadcast signals). At the UE, the UE receives the partitioned reference signals at the various scheduled subframes and combines the partitioned reference signals to obtain a full band measurement of the channel.

The present invention will be described with respect to example embodiments in a specific context, namely a Third Generation Partnership Project (3GPP) Long Term Evolution (LTE) compliant communications system that supports the transmission of CSI-RS to assist UEs in measuring channels. The invention may also be applied, however, to other standards compliant, such as IEEE 802.16, WiMAX, and the like, communications systems, as well as non-standards compliant communications systems that make use of reference signals to assist UEs in measuring channels.

Figure 1A:
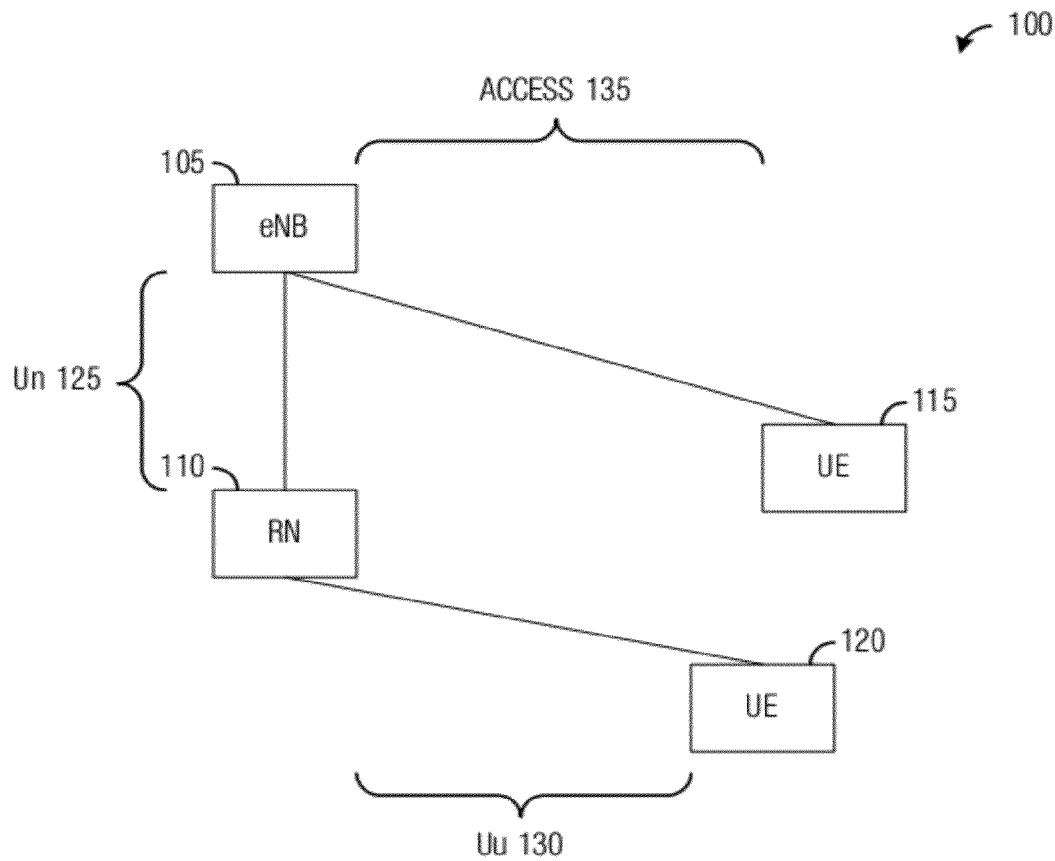
FIG. 1a illustrates an example first communications system according to example embodiments described herein.

FIG. 1a illustrates a first communications system 100. First communications system 100 includes an enhanced NodeB (eNB) 105, a relay node (RN) 110, a first User Equipment (UE) 115, and a second UE 120. While it is understood that communications systems may employ multiple eNBs capable of communicating with a number of UEs, only one eNB, two UEs, and one RN are illustrated for simplicity.

A RN is considered as a tool to improve, e.g., the coverage area of high data rate communications, group mobility, temporary network deployment, the cell-edge throughput, and/or to provide coverage in new areas. The RN is wirelessly connected to a wireless communications network via an eNB, such as eNB 105.

UE 115 and UE 120 may be communications devices that allow an operator to connect to a service, such as voice service, data service, multimedia service, and the like. As shown in FIG. 1, eNB 105 has allocated some resources to RN 110, which in turn, may allocate some resources (provided by eNB 105) to UE 120. eNB 105 may also directly communicate with UEs. For example, eNB 105 directly allocates resources to UE 115. Communications between eNB 105 and RN 110 may be made over a communications link (uplink and/or downlink directions) referred to as a Un link 120 or a wireless backhaul link, while communications between RN 110 and UE 120 may be made over a communications link (uplink and/or downlink directions) referred to as a Uu link 130 or an access link. Communications between eNB 105 and UE 115 may be made over communications link referred to as access link 135.

Figure 1B:
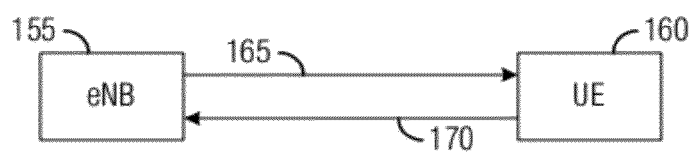
FIG. 1b illustrates an example second communications system according to example embodiments described herein.

FIG. 1b illustrates a second communications system 150. Communications system 150 includes an eNB 155 and a UE 160. Communications between eNB 155 and UE 160 may occur over uni-directional links. A uni-directional link from eNB 155 to UE 160 is referred to as a downlink (DL) 165 and a uni-direction link from UE 160 to eNB 155 is referred to as an uplink (UL) 170.

Generally, to improve the performance of communications system 150, UE 160 may measure DL 165 and provide CSI related to DL 165 to eNB 155. Similarly, eNB 155 may measure UL 170 and provide CSI related to UL 170 to UE 160.

Figures 2A, 2B:
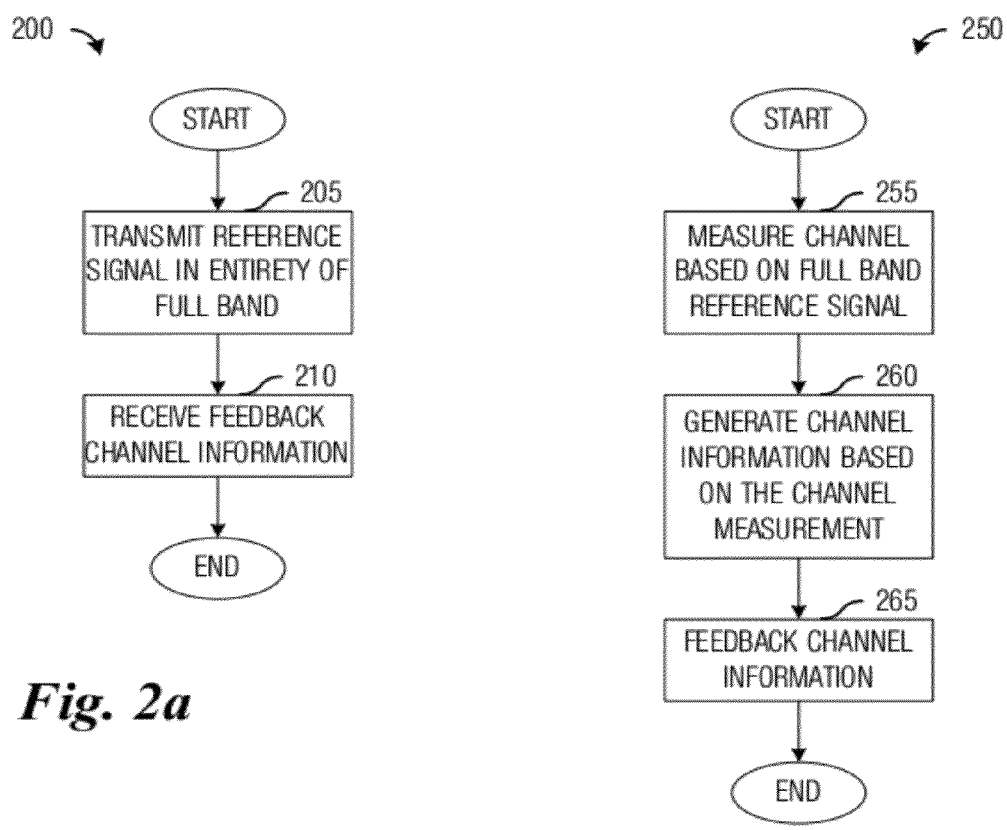
FIG. 2a illustrates an example flow diagram of eNB operations in receiving CSI feedback from a UE according to example embodiments described herein.
FIG. 2b illustrates an example flow diagram of UE operations in providing feedback to an eNB according to example embodiments described herein.

FIG. 2a illustrates a flow diagram of eNB operations 200 in receiving CSI feedback from a UE. eNB operations 200 may be indicative of operations occurring in an eNB, such as eNB 105 or eNB 155, as the eNB receives CSI feedback from a UE, such as UE 115 or UE 160, wherein the eNB and the UE are operating in a communications system.

eNB operations 200 may begin with the eNB transmitting a reference signal, such as a CSI-RS, to assist the UE in measuring a channel from the eNB to the UE (block 205). In order for the UE to accurately measure the channel, the reference signal may span an entirety of the bandwidth of the channel (or the communications system). The CSI-RS may be transmitted at a specified periodicity to help ensure that the UEs have up to date measurements of the channel, and hence, up to date CSI related to the channel.

The eNB may receive CSI feedback from the UE (block 210). The CSI feedback may be received over a reverse feedback channel. The CSI feedback from the UE may be quantized to help reduce feedback overhead. The eNB may use the CSI feedback to adjust its transmissions to the UE.

FIG. 2b illustrates a flow diagram of UE operations 250 in providing feedback to an eNB. UE operations 250 may be indicative of operations occurring in a UE, such as UE 115 or UE 160, as the UE provides CSI feedback to an eNB, such as eNB 105 or eNB 155, wherein the eNB and the UE are operating in a communications system.

UE operations 250 may begin with the UE measuring a channel from the eNB to the UE (block 255). The UE may make use of a reference signal, such as a CSI-RS, transmitted by the eNB to measure the channel. The CSI-RS may occupy an entire bandwidth of the channel or the communications system in order to help the UE accurately measure the entire channel. The UE may measure the channel at a specified periodicity to help ensure that it has up to date measurements of the channel.

The UE may generate the CSI from the measurement of the channel (block 260) and then provide the CSI to the eNB (block 265). The UE may quantize the CSI to help reduce feedback overhead.

Figure 3A:
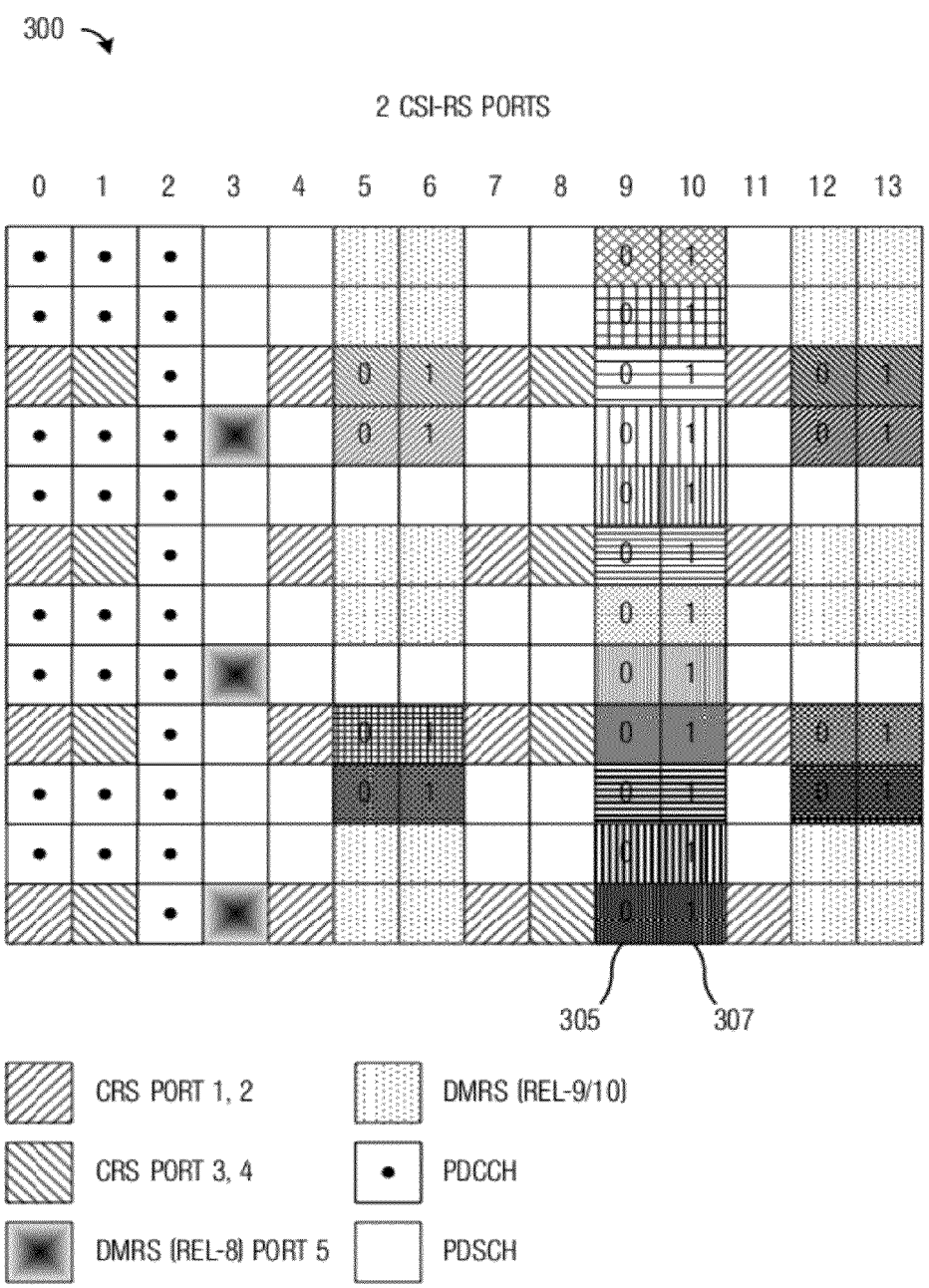
FIGS. 3a through 3c illustrate example resource blocks with possible locations for CSI-RS resource elements for different CSI-RS port configurations according to example embodiments described herein.

FIG. 3a illustrates a resource block (RB) 300 with possible locations for CSI-RS resource elements (REs) highlighted for a CSI-RS 2 port configuration. As shown in FIG. 3a, squares representing REs that may be used to convey CSI-RS are displayed with a numeral 0 or a numeral 1 within the squares. Furthermore, corresponding RE pairs of a single CSI-RS 2 port are shown in boxes with similar cross-hatching. As an example, RE 305 and RE 307 may be used to convey a corresponding RE pair.

RB 300 also highlights other REs that may be reserved to convey other signals, such as a common reference signal (CRS), demodulation reference signal (DMRS), a physical downlink control channel (PDCCH), a physical downlink shared channel (PDSCH), and the like. In general, the REs that are reserved for the conveyance of the other signals may not be used to convey the CSI-RS.

Table 1 displays possible values of subframe offset and duty cycle that may be configured for the CSI-RS. CSI reference signals are present in subframe number $n_s$ in frame number $n_f$ if the subframe offset and duty cycle satisfy $(10n_f + \lfloor n_s/2 \rfloor - \Delta_{CSI\text{-}RS}) \mod T_{CSI\text{-}RS} = 0$.

TABLE 1

CSI-RS subframe offset and duty cycle.

| $I_{cycle,\,subframeoffset}$ | Duty Cycle ($T_{CSIRS}$) | Subframe offset ($\Delta_{CSIRS}$) |
|---|---|---|
| $I_{cycle,\,subframeoffset} \leq 4$ | 5 | $I_{cycle,\,subframeoffset}$ |
| $I_{cycle,\,subframeoffset} \leq 14$ | 10 | $I_{cycle,\,subframeoffset} - 5$ |
| $I_{cycle,\,subframeoffset} \leq 34$ | 20 | $I_{cycle,\,subframeoffset} - 15$ |
| $I_{cycle,\,subframeoffset} \leq 74$ | 40 | $I_{cycle,\,subframeoffset} - 35$ |
| $I_{cycle,\,subframeoffset} \leq 154$ | 80 | $I_{cycle,\,subframeoffset} - 75$ |

Figure 3B:
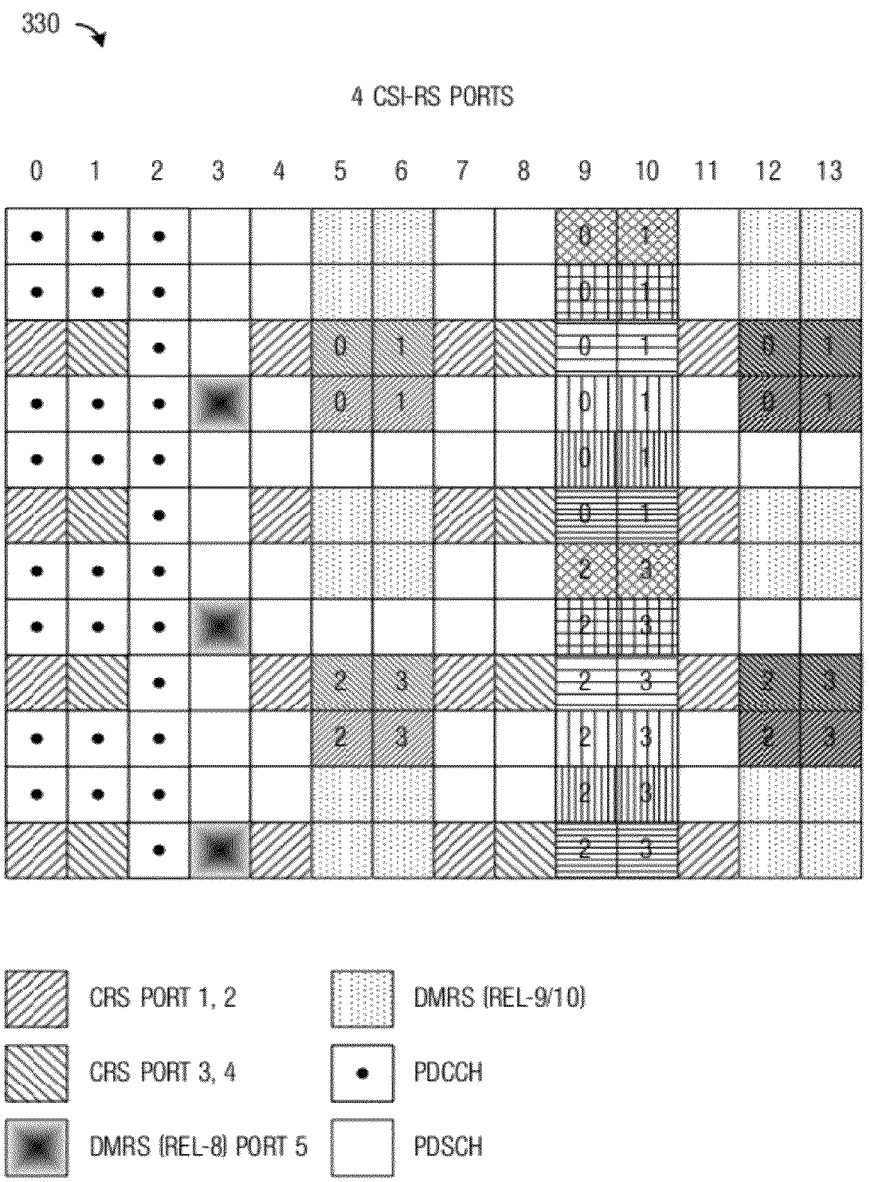
Figure 3C:
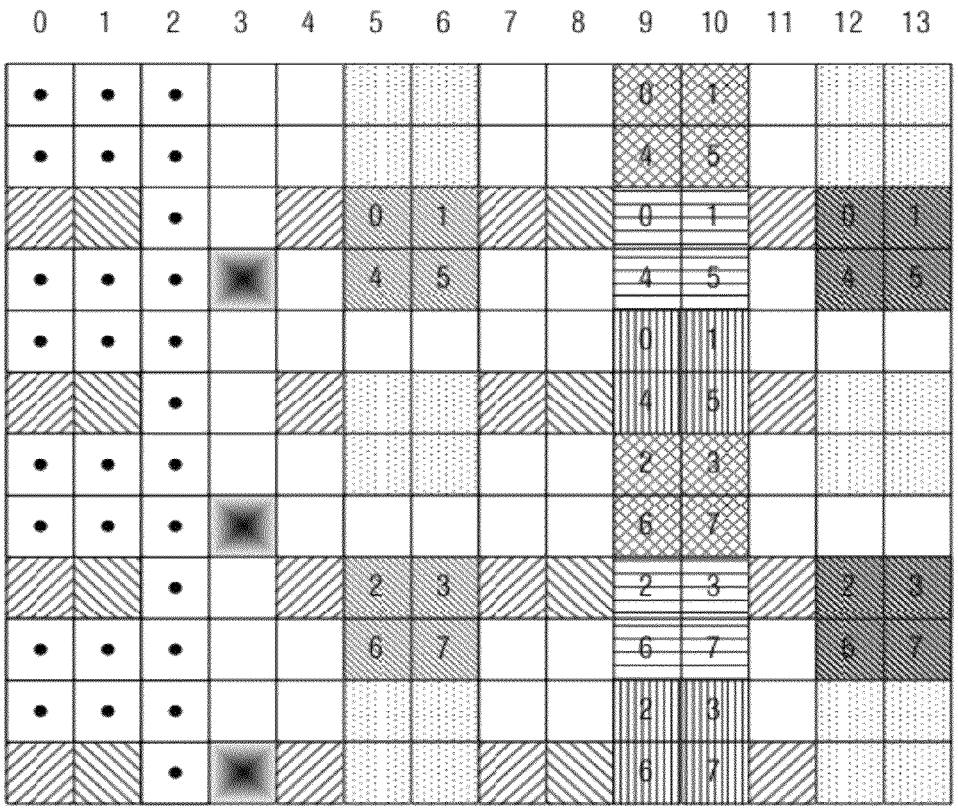

FIG. 3b illustrates a RB 330 with possible CSI-RS REs highlighted for a 4 CSI-RS port configuration. FIG. 3c illustrates a RB 360 with possible CSI-RS REs highlighted for an 8 CSI-RS port configuration.

Furthermore, some RBs, namely a group of 6 centrally located RBs, may be used to transmit special signals, such as synchronization signals and broadcast channels. The special signals may include a primary synchronization signal (PSS), a secondary synchronization signal (SSS), a physical broadcast channel (PBCH), a dynamic broadcast channel (DBCH), a system information block (SIB1), and the like. It should be noted that the DBCH and the SIB1 may be transmitted in any RB and are not restricted to only the 6 centrally located RBs. Should a collision between the CSI-RS and one or more special signals occur, the overall system performance may be dramatically impacted. Therefore, such collisions should be avoided.

Table 2 displays RE locations, subframe offset and duty cycle of synchronization signals and broadcast channel that carry system information parameters for frequency division duplexed (FDD) and time division duplexed (TDD) communications systems.

TABLE 2

Location of synchronization signals and broadcast channels.

| | FDD | TDD | Period |
|---|---|---|---|
| PSS | Last symbol (6 in normal CP, 5 in extended CP) in slots 0 (subframe 0) and 10 (subframe 5) on central 62 subcarriers (6 RBs) | Third symbol in subframes 1 (DwPTS) and 6 (DwPTS with TDD configurations 0, 1, 2, and 6) on the central 62 subcarriers (6 RBs) | 5 ms |
| SSS | Last but one symbol in slots 0 and 10 on the central 62 subcarriers (6 RBs) | Last symbol in slots 1 and 11 on the central 62 subcarriers (6 RBs) | 5 ms |
| PBCH | Symbols 7, 8, 9, and 10 in subframe 0 with normal DL CP on the 6 central RBs | Symbols 7, 8, 9, and 10 in subframe 0 with normal DL CP on the 6 central RBs | 10 ms |
| DBCH SIB1 | Data region in subframe 5 per 20 ms | Data region in subframe 5 per 20 ms | 20 ms |

However, if collisions between the CSI-RS and the synchronization signals and the broadcast channels are avoided by limiting the configuration of the CSI-RS subframe offset, duty cycle, and/or RE locations, then there may be a corresponding decrease in the number of orthogonal CSI-RSs that may be used by different eNBs (or cells of eNBs) in the communications system. Hence, there may also be a reduction in the accuracy of the measurements of the channels made based on the CSI-RS due to increased interference levels. Table 3 displays a reuse factor (i.e., a number of orthogonal patterns available within one subframe) for typical subframe offsets. It is noted that unless otherwise indicated, the CSI-RS reuse factor is the same for 1, 2, or 4 CRS ports.

TABLE 3

CSI-RS reuse factor assuming 4 CRS ports (1 or 2 CRS ports).

| Subframe (SF) offset | Normal DL CP | | | Extended DL CP | | |
|---|---|---|---|---|---|---|
| | 2 CSI-RS | 4 CSI-RS | 8 CSI-RS | 2 CSI-RS | 4 CSI-RS | 8 CSI-RS |
| FDD SFx, x ≠ 0.5 | 20 | 10 | 5 | 16(28) | 8(14) | 4(7) |
| FDD SF0 | 4 | 2 | 1 | 8 | 4 | 2 |
| FDD SF5 | 16 | 8 | 4 | 8(20) | 4(10) | 2(5) |
| TDD config 0 SF0 | 4 | 2 | 1 | 8 | 4 | 2 |
| TDD config 0 SF1 | 0 | 0 | 0 | 0 | 0 | 0 |
| TDD config 0 SF5 | 16 | 8 | 4 | 8(20) | 4(10) | 2(5) |
| TDD config 6 SF0 | 4 | 2 | 1 | 8 | 4 | 2 |
| TDD config 6 SF1 | 0 | 0 | 0 | 0 | 0 | 0 |
| TDD config 6 SF5 | 16 | 8 | 4 | 8(20) | 4(10) | 2(5) |
| TDD config 6 SF9 | 20 | 10 | 5 | 16(28) | 8(14) | 4(7) |

Another consequence of limiting the configuration of the CSI-RS subframe offset, duty cycle, and/or RE locations may be an increase in the minimum duty cycle that can be configured for the CSI-RS, therefore a maximum UE speed supported by the communications system for high-data rate transmission relying on CSI feedback based on measurements of the CSI-RS may be reduced.

Figure 4A:
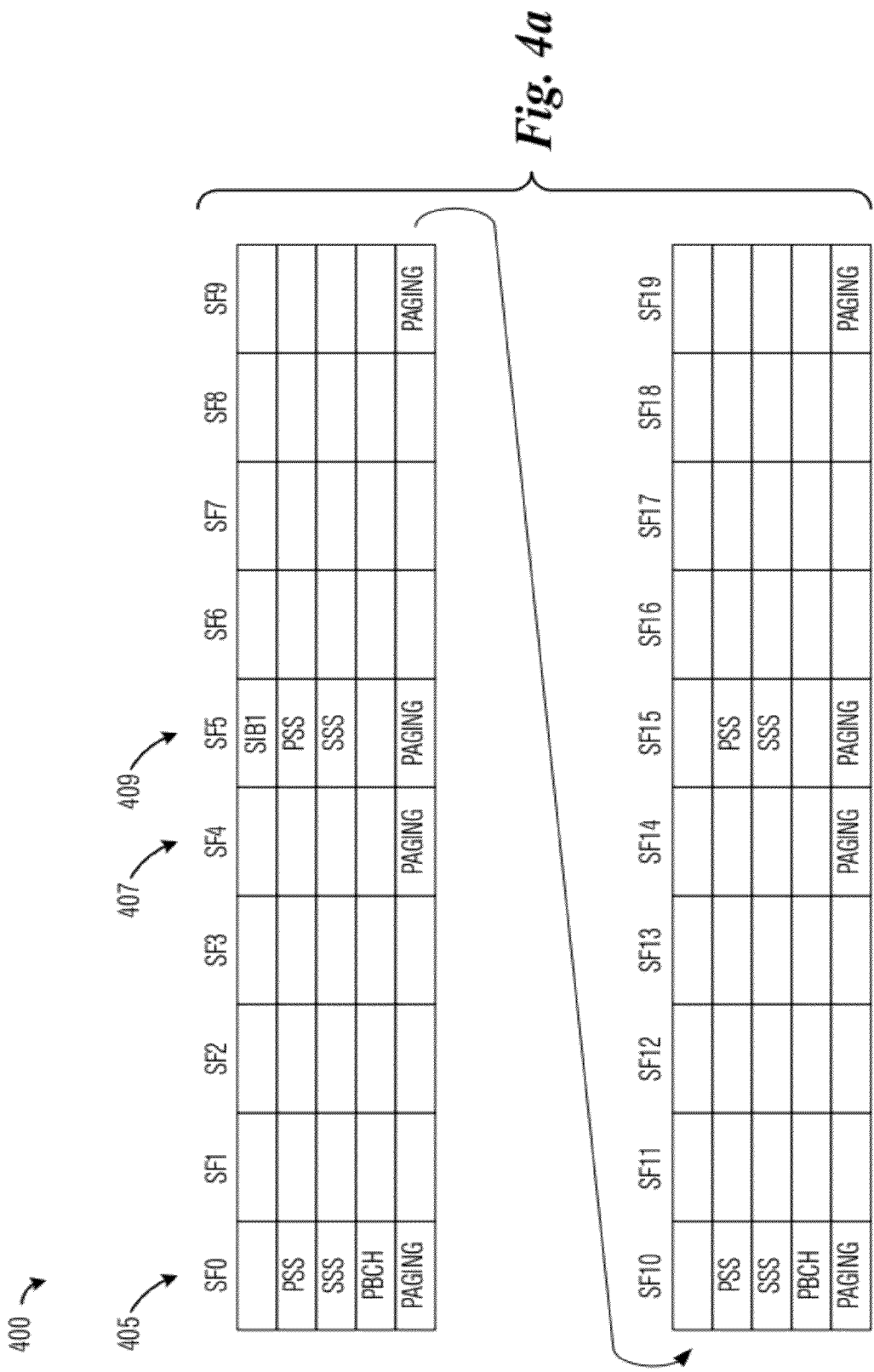

FIG. 4a illustrates a diagram of a sequence of subframes (SF0 to SF19) 400 for a number of central RBs in a FDD DL of a communications system. It is noted that paging channels, DBCH, and SIB1 are not necessarily restricted to transmission in the central RBs. Therefore, in situations when the paging channels, DBCH, and SIB1 are transmitted outside of the central RBs, sequence of subframes 400 may be illustrative of not only central RBs but also RBs outside of the central RBs. In a FDD communications system, access to at least a portion of the bandwidth of the communications system is generally available at all times. Sequence of subframes 400 illustrates synchronization signals and broadcast channels transmitted in a number of central RBs in a FDD DL of a communications system. As shown in FIG. 4a, in SF0 405 a PSS, a SSS, a PBCH, and a paging channel are transmitted. Similarly, in SF4 407 a paging channel is transmitted, while in SF5 409 a SIB1, a PSS, a SSS, and a paging channel are transmitted.

Hence, transmission of a CSR-RS during any of these subframes, as well as other subframes illustrated in FIG. 4a, may result in collisions between the CSI-RS and the synchronization signals and the broadcast channels, which may negatively impact the performance of the communications system.

However, in a FDD communications system, it may be simple avoid collisions by not scheduling the CSI-RS in SF0 405, SF4 407, SF5 409, and other subframes that are used to transmit the periodic synchronization signals and broadcast channels. As an example, a restricted number of CSI-RS configurations that use orthogonal frequency division multiplexed (OFDM) symbols that do not collide with the PSS, the SSS, and the PBCH may be transmitted in SF0 405 and SF5 409 with a duty cycle of 5 ms. However, these CSI-RS configurations may collide with the SIB1 in SF5 409 every 20 ms. Hence, SF15 may only be available for 10 ms duty cycle operation with the CSI-RS configurations. While only the 10 ms duty cycle is available for SF15, for other subframes, such as SF1, SF2, SF3, SF6, SF7, and SF8, a shorter duty cycle (e.g., 5 ms and multiples of 5 ms) may be available. Therefore, a reuse factor of 16, 8, and 4 are achieved for 2, 4, and 8 CSI-RS ports, respectively, when 1, 2 or 4 CRS ports are configured (as shown in Table 3).

Figure 4B:
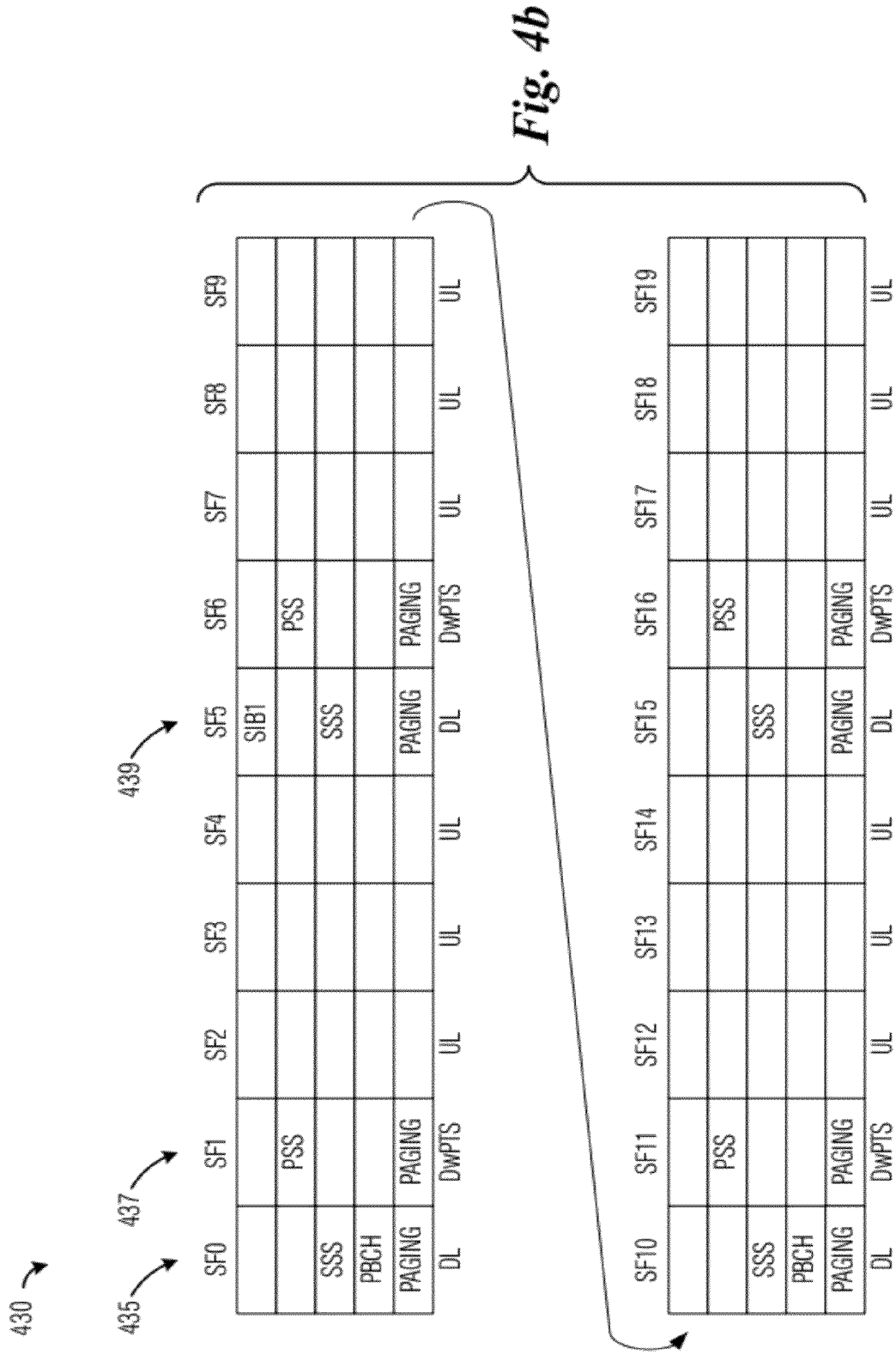

FIGS. 4b and 4c illustrate diagrams of a sequence of subframes (SF0 to SF19) 430 for a number of central RBs (and RBs outside of the central RBs in some situations) in a TDD DL of a communications system, wherein the communications system is in a TDD Configuration 0, and a sequence of subframes (SF0 to SF19) 460 for a number of central RBs in a TDD DL of a communications system, wherein the communications system is in a TDD Configuration 6, respectively.

In a TDD communications system, access to the bandwidth of the communications system is generally available at certain times. As an example, DL transmissions of the communications system configured in a TDD Configuration 0 are available only during two of every five subframes (e.g., SF0 435 and SF1 437). As another example, DL transmissions of the communications system configured in a TDD Configuration 6 are available only during three of every five subframes (e.g., SF0 465, SF1 467 and SF9 469 for TDD Configuration 6).

In the communications system configured in a TDD Configuration 6, SF9 469 may be used to transmit any CSI-RS configuration with a duty cycle of at least 10 ms while avoiding collisions with the synchronization signals and broadcast channels as well as SIB1. However, such a subframe is not available in the communications system configured in a TDD Configuration 0.

A restricted number of CSI-RS configurations that use OFDM symbols that do not collide with the synchronization signals and the broadcast channels may be used in SF0 435 and SF5 439 with any duty cycle. But the CSI-RS reuse factor may be limited in the worse case to 4, 2, or 1 for 2, 4, or 8 CSI-RS ports, respectively, when 4 CRS ports are configured. Furthermore, if collisions with SIB1 (e.g., in SF5 439) are to be avoided, the duty cycle may need to be greater than 20 ms.

Rather than simply avoiding the configuration of CSI-RS RE locations, subframe offsets, and duty cycles that would result in collisions with the synchronization signals, broadcast channels, and/or SIB1, it may be possible to simply not transmit CSI-RS in REs (or in RBs) where a collision would occur. As an example, it may be possible to simply not transmit CSI-RS in the central RBs in SF0 and SF5 in the DL carrier of a communications system operating in FDD mode. By avoiding the central RBs, an increased number of orthogonal CSI-RS patterns may be used in SF0 and SF5.

However, by avoiding the central RBs, the quality of the channel measurement (and hence the quality of the channel estimation) at RBs near and adjacent to the central RBs (where there is no CSI-RS) may be significantly decreased since it would no longer be possible to interpolate the channel in the frequency domain to achieve better accuracy or it would require more complex and more costly implementations. Additionally, channel measurements and corresponding CSI feedback for the central RBs would not be available, i.e., the CSI-RS is not available for the full bandwidth of the communications system, thereby potentially preventing an eNB from scheduling transmissions to UEs on the central RBs with accurate link adaptation and with beamforming gain.

Figure 5A:
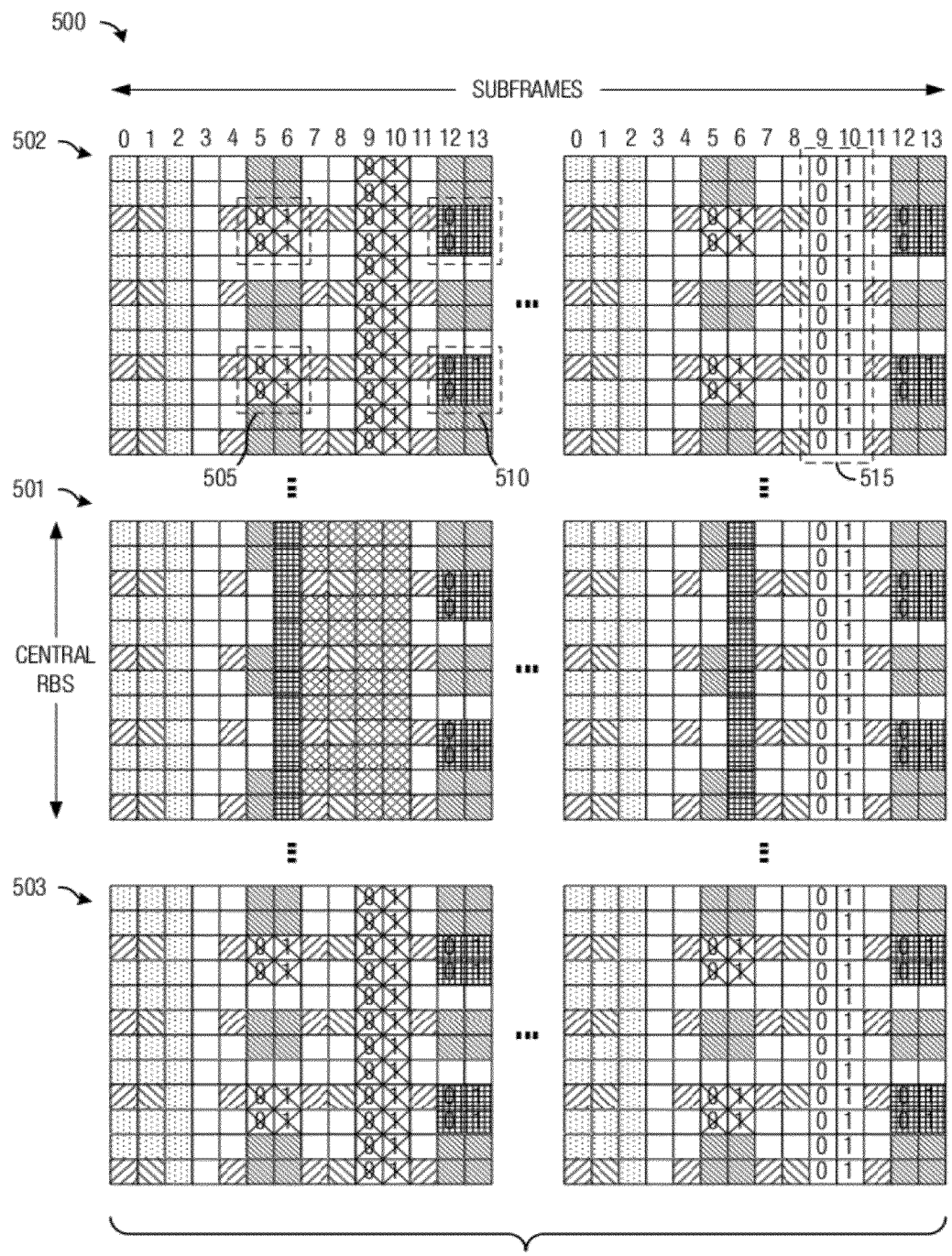
FIG. 5a illustrates an example first resource element diagram of subframes of a plurality of resource blocks according to example embodiments described herein.
Figure 5B:
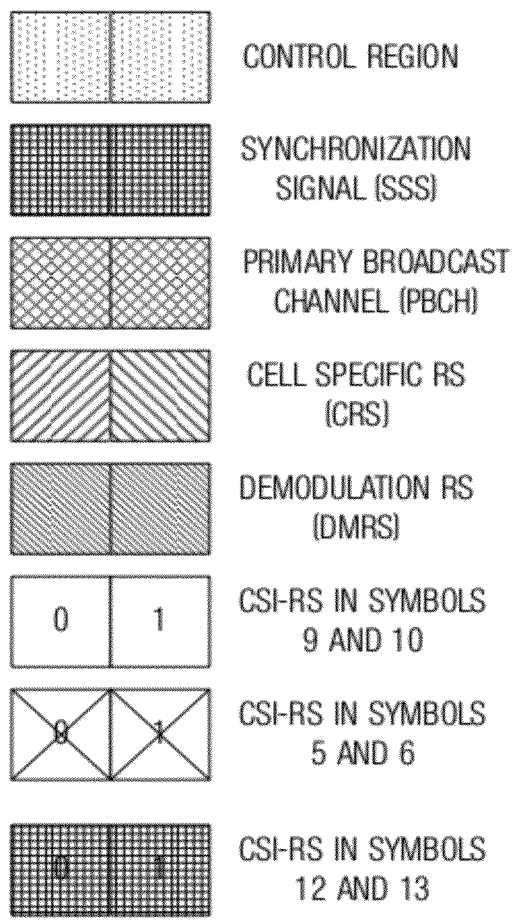
FIG. 5b illustrates a legend for first resource element diagram of subframes of FIG. 5a according to example embodiments described herein.

FIG. 5a illustrates a first RE diagram 500 of subframes of a plurality of RBs. First RE diagram 500 displays information being transmitted in REs in the subframes of the plurality of RBs. A legend for FIG. 5a is illustrated in FIG. 5b. As shown in FIG. 5a, RB 501 is used to represent a central RB, while RB 502 and RB 503 are used to represent RBs above and below the central RBs, respectively, in frequency. Valid CSI-RS patterns based on the above discussed technique of not transmitting CSI-RS in RBs where they would collide with synchronization signals, broadcast channels, SIB1, and the like, with a requirement that the CSI-RS are full bandwidth CSI-RS is met are shown. It is noted that crossed-out CSI-RS patterns are not permitted due to collisions with a synchronization signal, a broadcast channel, a SIB1, and the like. The CSI-RS may be separated into several groups according to their location in terms of OFDM symbol.

The CSI-RS groups may include:

Group 1: CSI-RS patterns in OFDM symbols 5 and 6, such as patterns 505, may not be allowed because they would collide with the SSS in the central RBs in SF0. They are also not allowed in SF5 since their presence in SF0 and SF5 would imply a duty cycle of 5 ms, which would have resulted in a collision in SF0. However, if they are present in SF5 with a 10 ms or a multiple of 10 ms duty cycle, then their presence is permissible;

Group 2: CSI-RS patterns in OFDM symbols 12 and 13, such as patterns 510, may be allowed in both SF0 and SF5 because they never collide with the SSS and the PBCH. Hence, a reuse factor of 4 (for a 2 CSI-RS port configuration) may be available with a duty cycle of either 5 ms or 10 ms; and Group 3: CSI-RS patterns in OFDM symbols 9 and 10, such as patterns 515, may be allowed only in SF5 because they collide with the PBCH. They may be configured with a 10 ms duty cycle.

It is noted that since the SIB1 is transmitted in SF5 every 20 ms, the CSI-RS patterns in Groups 1, 2, and 3 will collide with the SIB1 every 20 ms, regardless of where the SIB1 is transmitted within the bandwidth of the communications system because the CSI-RS patterns are full bandwidth patterns. Therefore, if collisions with the SIB1 are to be avoided, only the CSI-RS patterns in Group 2 allow a duty cycle of 10 ms to be achieved over the full bandwidth without colliding with the synchronization signals, the broadcast channels, and the SIB1. However, the CSI-RS patterns in Group 2 are limited to a reuse factor of 4.

According to an example embodiment, it may not be necessary to transmit a full bandwidth CSI-RS at any given time (or subframe). Instead, it may be possible to transmit multiple subband CSI-RS at different times (or subframes), wherein the multiple subband CSI-RS may be combined to form a full bandwidth CSI-RS. The UE may make measurements of the channel based on the various subband CSI-RS and determine a full band measurement from the subband measurements.

Figure 6A:
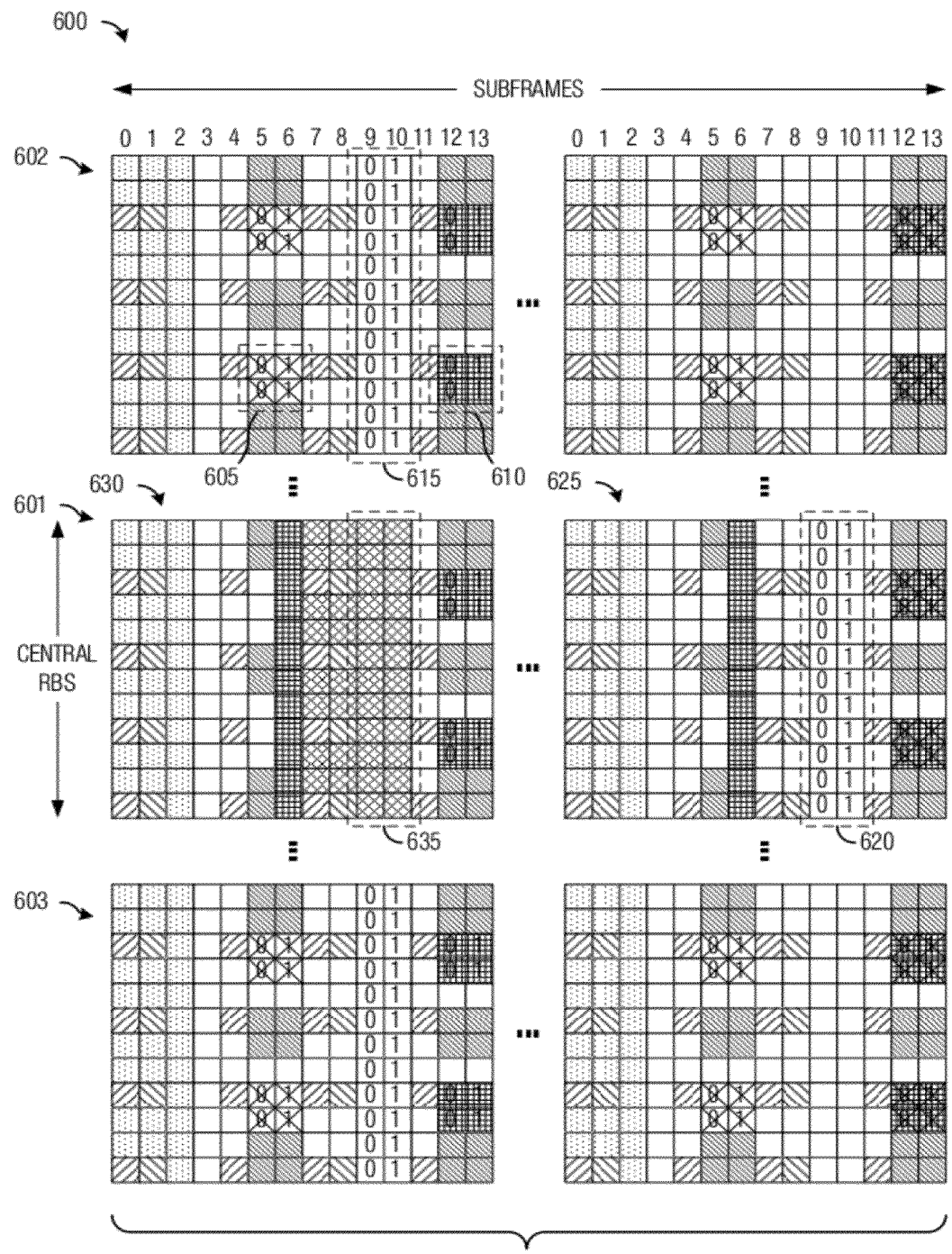
FIG. 6a illustrates an example second resource element diagram of subframes of a plurality of resource blocks according to example embodiments described herein.
Figure 6B:
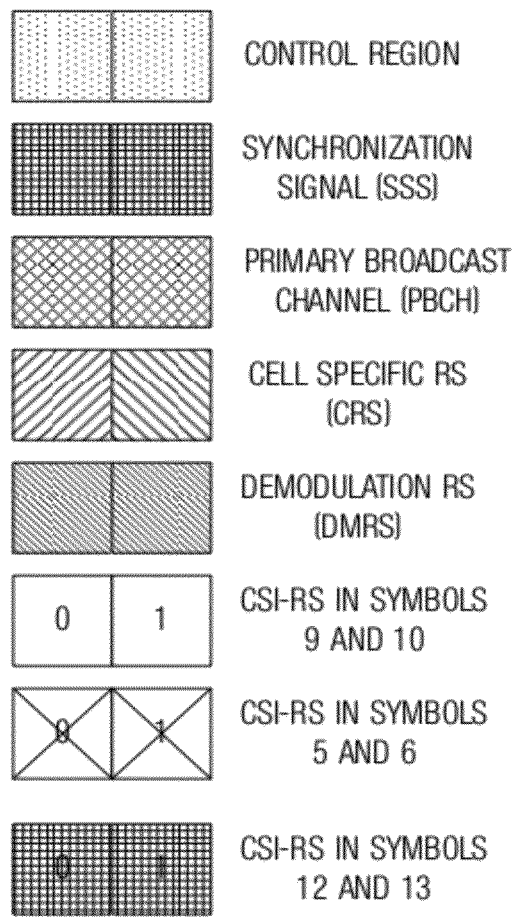
FIG. 6b illustrates a legend for first resource element diagram of subframes of FIG. 6a according to example embodiments described herein.

FIG. 6a illustrates a second RE diagram 600 of subframes of a plurality of RBs. Second RE diagram 600 displays information being transmitted in REs in the subframes of the plurality of RBs. A legend for FIG. 6a is illustrated in FIG. 6b. As shown in FIG. 6a, RB 601 is used to represent a central RB, while RB 602 and RB 603 are used to represent RBs above and below the central RBs, respectively, in frequency. Valid subband CSI-RS patterns based on the technique of partitioning a full band CSI-RS into multiple subband CSI-RSs that may be transmitted at different times (or subframes) to avoid collision with synchronization signals, broadcast channels, SIB1, and the like, are shown. It is noted that crossed-out CSI-RS patterns are not permitted due to collisions with a synchronization signal, a broadcast channel, a SIB1 (which may be transmitted outside of the central RBs), and the like. The CSI-RS may be separated into several groups according to their location in terms of OFDM symbol.

The CSI-RS groups may include:

Group 1': CSI-RS patterns in OFDM symbols 5 and 6, such as patterns 605, may still not be allowed because they would collide with the SSS in the central RBs in both SF0 and SF5 since their presence in both SF0 and SF5 imply a 5 ms duty cycle;

Group 2': CSI-RS patterns in OFDM symbols 12 and 13, such as patterns 610, may be allowed in SF0 because they may never collide with the SSS and PBCH, but not in SF5 since they may collide with the SIB1 at least in some RBs within the bandwidth. They achieve a reuse factor of 4 in subframe 0 with a duty cycle of 10 ms; and Group 3': CSI-RS patterns in OFDM symbols 9 and 10, such as patterns 615, may be allowed in SF0 outside the central RBs. If they are configured with a duty cycle of 10 ms in SF0, then they automatically skip the central RBs in SF0, and the CSI-RS are automatically reported in the central RBs in the subsequent SF5, such as patterns 620.

Considering as an example, patterns 620 that are transmitted in subframe 625. Which if transmitted in subframe 630 in a location indicated by REs 635 would have collided with the PBCH. However, by moving patterns 620 from subframe 630 to subframe 625, patterns 620 may be transmitted without collision.

The partitioning of the full band CSI-RS into multiple subband CSI-RSs, which may be RB sized, multiple RB sized, RE sized, multiple RE sized, and the like, allows for the adaptation of the transmission of the CSI-RS in the presence of special signals which may cause collisions.

A benefit of partitioning the full band CSI-RS into multiple subbands is that a scheduler in the eNB may be permitted to position the SIB1 outside of the central RBs in SF5 every 20 ms. Therefore, collisions with the CSI-RS of group 3' may be avoided even if they have a 10 ms duty cycle. Furthermore, the 10 ms duty cycle may be achieved with 16 orthogonal CSI-RS patterns, compared to only 4 orthogonal CSI-RS patterns in group 2. The channel measurements for the central RBs and the remainder of the bandwidth of the communications system may be staggered in time while maintaining a 10 ms duty cycle. It is noted that the 10 ms duty cycle may be small enough to allow fixed and low mobility UE to assume that the channel has not changed between SF0 and SF5. Therefore, it may be possible to combine the measurements on SF0 and SF5 and concatenate them as if they occurred in a single subframe. Alternatively, advanced channel estimation techniques like interpolation in the time and frequency domains may be available for improving the quality of the channel estimation.

FIG. 7a illustrates a first time-frequency diagram 700 highlighting a full band CSI-RS 705. As shown in FIG. 7a, full band CSI-RS 705 is transmitted in its entirety at a single time instance, e.g., in a subframe. If there are no special signals, such as synchronization signals, broadcast channels, SIB1, and the like, being transmitted at the same time instance, the transmission of full band CSI-RS 705 may occur without collision.

FIG. 7b illustrates a second time-frequency diagram 720 highlighting a full band CSI-RS 725. As shown in FIG. 7b, full band CSI-RS 725 is transmitted in its entirety at a single time instance, e.g., in a subframe. However, there are special signals, such as synchronization signals, broadcast channels, SIB1, and the like, being transmitted at the same time instance (shown as highlight 727 and highlight 729). Therefore, collisions between full band CSI-RS 725 and the special signals may occur.

FIG. 7c illustrates a third time-frequency diagram 740 highlighting a full band CSI-RS 745. Since the transmission of full band CSI-RS 745 occurring at a single time instance collides with special signals, full band CSI-RS 745 may be partitioned into multiple subbands, such as first subband 747, second subband 748, third subband 749, fourth subband 750, and fifth subband 751.

Although shown in FIG. 7c as being partitioned into five subbands, full band CSI-RS 745 may be partitioned into a larger number of subbands or a smaller number of subbands depending on a number of special signals and their location. Therefore, the discussion of full band CSI-RS 745 being partitioned into five subbands should not be construed as being limiting to either the scope or spirit of the example embodiments.

According to an example embodiment, the partitioning of full band CSI-RS 745 may be implemented to meet a number of partitioning criteria, which may include, minimizing a number of subband CSI-RSs, minimizing a frequency span of subband CSI-RSs spanning collisions, maximizing a frequency span of subband CSI-RSs not spanning collisions, and the like.

FIG. 7d illustrates a fourth time-frequency diagram 760 highlighting transmission of a full band CSI-RS in the presence of special signals by transmitting subbands of the full band CSI-RS. As shown in FIG. 7d, the full band CSI-RS may be partitioned into five subbands, first subband 770, second subband 771, third subband 772, fourth subband 773, and fifth subband 774.

According to an example embodiment, in order to avoid collisions with special signals 776 and 777, some of the subbands of the full band CSI-RS may be scheduled for transmission at a different time instance.

As shown in FIG. 7d, first subband 770, third subband 772, and fifth subband 774 may be transmitted at a first time instance 765. While special signals 776 and 777 may also be transmitted at first time instance 765, they are transmitted at different frequency resources. Therefore, collisions do not occur between first subband 770, third subband 772, fifth subband 774, and special signals 776 and 777. Second subband 771 and fourth subband 773, which may collide with special signals 776 and 777 if transmitted at first time instance 765, may be transmitted at a second time instance 767.

FIG. 7e illustrates a fifth time-frequency diagram 760 highlighting transmission of a full band CSI-RS in the presence of special signals by transmitting subbands of the full band CSI-RS. As shown in FIG. 7e, the full band CSI-RS may be partitioned into three subbands, first subband 790, second subband 791, and third subband 792.

According to an example embodiment, in order to avoid collisions with special signals 794 and 795, some of the subbands of the full band CSI-RS may be scheduled for transmission at a different time instance.

As shown in FIG. 7e, first subband 790 and third subband 792 may be transmitted at a first time instance 785. While special signals 794 and 795 may also be transmitted at first time instance 785, they are transmitted at different frequency resources. Therefore, collisions do not occur between first subband 790, third subband 792, and special signals 794 and 795. Second subband 791, which may collide with special signals 794 and 795 if transmitted at first time instance 785, may be transmitted at a second time instance 787.

By partitioning a full band CSI-RS (as well as other full band signals) into subbands and scheduling the transmission of the subbands at time instances where special signals are transmitted but at different frequency resources, collisions between the full band CSI-RS and other full band signals and the special signals may be avoided.

Figures 8A, 8B:
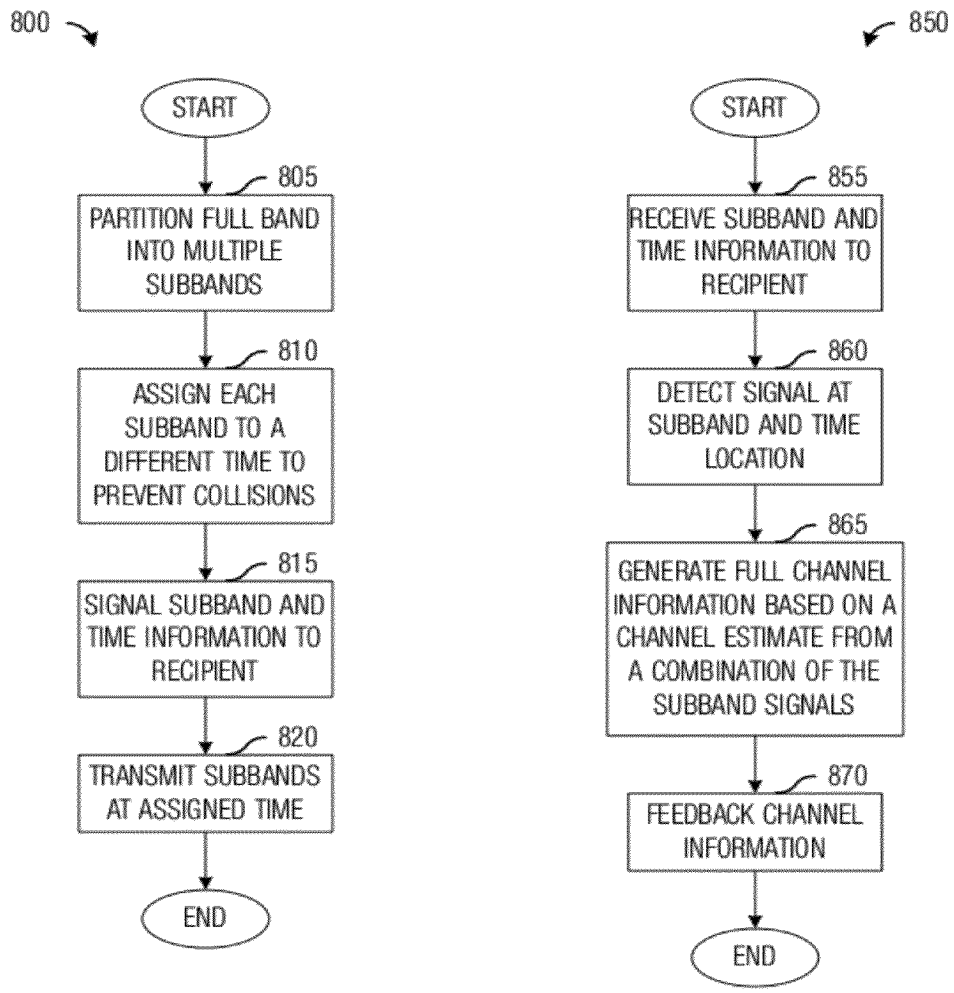
FIG. 8a illustrates an example flow diagram of communications controller operations in transmitting a full band CSI-RS according to example embodiments described herein.
FIG. 8b illustrates an example flow diagram of communications device operations in providing channel information feedback to a communications controller according to example embodiments described herein.

FIG. 8a illustrates a flow diagram of communications controller operations 800 in transmitting a full band CSI-RS. Communications controller operations 800 may be indicative of operations occurring in a communications controller, such as an eNB, a cell of an eNB, a low power node, a relay node, and the like, as the communications controller transmits a full band CSI-RS (or other full band signals) that may collide with special signals, such as synchronization signals, broadcast channels, SIB1, and the like.

Communications controller operations 800 may begin with the communications controller partitioning the full band CSI-RS (or other full band signals) into multiple subbands based on known or expected location of special signals that may collide with the full band CSI-RS (block 805). The full band CSI-RS signal may be part of a set of orthogonal full band CSI-RS signals. Since the location of the special signals is generally known in advance, the communications controller may know how it is going to partition the full band CSI-RS. The communications controller may save the partitioning information for subsequent use.

As an example, referencing FIG. 7b, wherein special signals 727 and 729 would collide with full band CSI-RS 725 if they were transmitted at the same time. Partitioning full band CSI-RS 725 into multiple subbands may simply involve finding a lowest frequency other signal and a highest frequency other signal and partitioning full band CSI-RS 725 into at most three subbands, with a first subband spanning a lowest frequency portion of full band CSI-RS 725 to the lowest frequency other signal, a second subband spanning the lowest frequency other signal to the highest frequency other signal, and a third subband spanning the highest frequency other signal to a highest frequency portion of full band CSI-RS 725. Alternatively, different subbands may be formed around subsets of the other signals. For example, if the other signals are dispersed relatively far apart in frequency, then a subband may be formed around each of the other signals. If some of the other signals are grouped closely grouped together in frequency, then a single subband may be formed around the other signals that are grouped closely together. A combination of subbands formed around single other signals and groups of other signals are possible.

Additionally, the communications controller may be able to adaptively adjust the partitioning of the full band CSI-RS based on the special signals whose transmission may collide with the full band CSI-RS. As an example, if a new signal is scheduled for transmission, its frequency location and time location may be noted by the communications controller. The communications controller may then adjust the partitions of the full band CSI-RS to avoid future collisions with the new signal.

The communications controller may assign each subband of the full band CSI-RS for transmission at potentially different times to prevent collisions with the special signals (block 810). As an example, if a subband transmitted at a first time instance would result in a collision with special signal(s), then the subband may be assigned for transmission at a different time instance. Since the subbands are frequency specific, their frequency locations generally are not changed and only their time location assignments are changed.

According to an example embodiment, the communications controller may schedule the subbands based on scheduling criteria, which may include minimize a number of time instances used to transmit all of the subbands of the full band CSI-RS, maximize a number of subbands transmitted per time instance, meet desired duty cycle of the full band CSI-RS, meet desired reuse factor, conform to available time resources and frequency resources of the communications system, minimize a number of subband signals, maximize a number of subband signals, and the like.

As an example, referencing FIG. 7e, the communications controller may assign first subband 790 and third subband 792 for transmission at first time instance 785 since they do not collide with special signals 794 and 795 in first time instance 785. However, if second subband 791 were to be assigned for transmission at first time instance 785, then collisions with special signals 794 and 795 would occur. Therefore, to avoid the collisions, second subband 791 may need to be scheduled at a different time instance, such as second time instance 787.

Referring back to FIG. 8a, after assigning the subbands of the full band CSI-RS for transmission at different time instances, the communications controller may signal information regarding the subbands and their assigned transmission instances to a recipient, such as a UE (block 815). As an example, the communications controller may signal time resource and frequency resource information about the subbands to the recipient. The communications controller may then transmit the subbands at the assigned time instances.

FIG. 8b illustrates a flow diagram of communications device operations 850 in providing channel information feedback to a communications controller. Communications device operations 850 may be indicative of operations occurring in a communications device, such as a UE, as the communications device generated channel information based on estimates of a channel between the communications controller and the communications device determined from subbands of a full band CSI-RS (or some other full band signal) transmitted by the communications controller.

Communications device operations 850 may begin with the communications device receiving information regarding the subbands of the full band CSI-RS (block 855). The full band CSI-RS signal may be part of a set of orthogonal full band CSI-RS signals. According to an example embodiment, the communications device may receive information such as information regarding a number of subbands, information about time instances of when the subbands will be transmitted, information about frequency resources of the subbands, and the like.

The communications device may detect the signal, e.g., the CSI-RS, of the subband at the frequency resource(s) and the time resource(s) signaled by the communications controller (block 860) and generate the channel information from channel estimates based on the signals in the subbands (block 865). Although shown as two separate operations by the communications device, in some scenarios, detecting the signal and generating the channel estimates may be combined into a single operation. As an example, in a situation wherein generating the channel estimates involves interpolation in both the time and the frequency domains, detecting the signal and generating the channel estimates may be combined into a single operation.

According to an example embodiment, since the communications device is not receiving the entire full band CSI-RS at a single time, the communications device may not be able to immediately generate an estimate for the channel for the entire full band. The communications device may wait until it has received all of the subbands of the full band CSI-RS before it estimates the channel to generate the channel information for the channel.

As an example, if the full band CSI-RS is partitioned into two subbands and a first subband is transmitted in a first subframe with a 10 ms duty cycle and a second subband is transmitted in a second subframe with a 5 ms duty cycle, then after the communications device receives the first subframe and the second subframe, it may be able to generate the channel information for the channel based on the first subband received in the first subframe and the second subband received in the second subframe. The communications device may combine the subband CSI-RS from the first subband and the subband CSI-RS from the second subband and estimate the channel based on the combined CSI-RS. The communications device may then generate the channel information for the entire channel from the channel estimate.

Then, after the communications device receives the second subband again in a sixth subframe, the communications device may be able to generate updated channel information based on a combination of the subband CSI-RS received in the first subframe and the subband CSI-RS received in the sixth subframe. Then, after the communications device receives the first subband in the 10-th subframe and the second subband in the 11-th subframe, the communications device may be able to generate updated channel information based on a combination of the subband CSI-RS received in the 10-th subframe and the subband CSI-RS received in the 11-th subframe. The communications device may continue to update the channel information based on a newly received first (or second) subband and a previously received second (or first) subband.

Since the duty cycle of the second subband is 5 ms and is shorter than the duty cycle of the first subband (10 ms), the communications device may be able to generate updated channel information for the entire full band once every 5 ms.

After generating the channel information from the subbands, the communications device may feedback the channel information to the communications controller (block 870).

Figure 9:
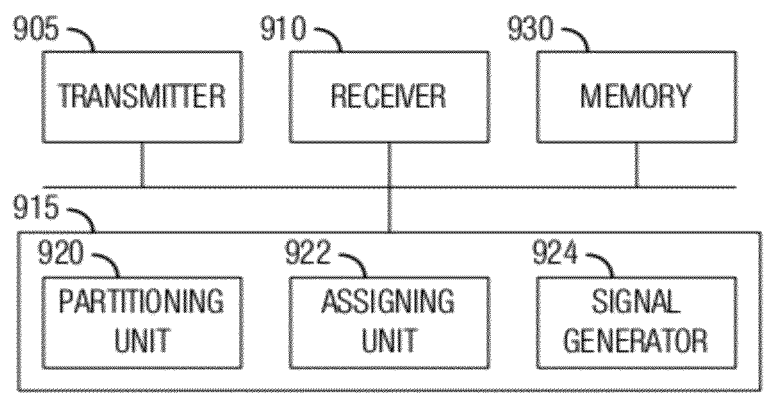
FIG. 9 illustrates an example diagram of a communications controller according to example embodiments described herein.

FIG. 9 illustrates a diagram of a communications controller 900. Communications controller 900 may be an implementation of an eNB, a low power cell, and the like, of a communications system. Communications controller 900 may be used to implement various ones of the embodiments discussed herein. As shown in FIG. 9, a transmitter 905 is configured to send control channels, messages, information, and the like, and a receiver 910 is configured to receive messages, information, and the like. Transmitter 905 and receiver 910 may have a wireless interface, a wireline interface, or a combination thereof.

A partitioning unit 920 is configured to partition a full band CSI-RS into a plurality of subbands. Partitioning unit 920 may make use of information about special signals which may collide with the full band CSI-RS in order to partition the full band CSI-RS. An assigning unit 922 is configured to assign the plurality of subbands to different time instances for transmission to avoid collisions with the special signals. A signal generator 924 is configured to generate signals to be transmitted by transmitter 905. A memory 930 is configured to store the plurality of subbands, subband assignments, information about the special signals, and the like.

The elements of communications controller 900 may be implemented as specific hardware logic blocks. In an alternative, the elements of communications controller 900 may be implemented as software executing in a processor, controller, application specific integrated circuit, and the like. In yet another alternative, the elements of communications controller 900 may be implemented as a combination of software and/or hardware.

As an example, transmitter 905 and receiver 910 may be implemented as a specific hardware block, while partitioning unit 920, assigning unit 922, and signal generator 924 may be software modules executing in a processor 915, such as a microprocessor, a digital signal processor, a custom circuit, or a custom compiled logic array of a field programmable logic array.

Figure 10:
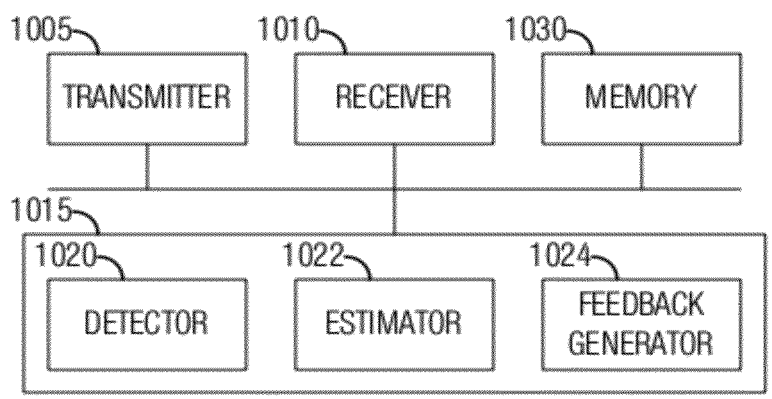
FIG. 10 illustrates an example diagram of a communications device according to example embodiments described herein.

FIG. 10 illustrates a diagram of a communications device 1000. Communications device 1000 may be an implementation of a UE, and the like, of a communications system. Communications device 1000 may be used to implement various ones of the embodiments discussed herein. As shown in FIG. 10, a transmitter 1005 is configured to send control channels, messages, information, and the like, and a receiver 1010 is configured to receive messages, information, and the like. Transmitter 1005 and receiver 1010 may have a wireless interface, a wireline interface, or a combination thereof.

A detector 1020 is configured to detect transmissions, such as subband CSI-RS at specified frequency resource(s) and time resource(s). As an example, detector 1020 may perform blind detection at the specified frequency resource(s) and time resource(s) to find signals transmitted to communications device 1000. An estimator 1022 is configured to estimate a communications channel between communications device 1000 and a communications controller serving communications device 1000 based on signals, such as CSI-RS, transmitted by the communications controller. Estimator 1022 may make use of a plurality of subband signals transmitted by the communications controller to estimate the channel. A feedback generator 1024 is configured to generate channel information from the estimate of the channel produced by estimator 1022, where the channel information is to be fedback to the communications controller. A memory 1030 is configured to store detected signals, channel estimates, channel information, and the like.

The elements of communications device 1000 may be implemented as specific hardware logic blocks. In an alternative, the elements of communications device 1000 may be implemented as software executing in a processor, controller, application specific integrated circuit, and the like. In yet another alternative, the elements of communications device 1000 may be implemented as a combination of software and/or hardware.

As an example, transmitter 1005 and receiver 1010 may be implemented as a specific hardware block, while detector 1020, estimator 1022, and feedback generator 1024 may be software modules executing in a processor 1015, such as a microprocessor, a digital signal processor, a custom circuit, or a custom compiled logic array of a field programmable logic array.

Although the present invention and its advantages have been described in detail, it should be understood that various changes, substitutions and alterations can be made herein without departing from the spirit and scope of the invention as defined by the appended claims.

What is claimed is:

1. A method for operating a communications controller, the method comprising:
   partitioning a full band signal selected from a set of orthogonal full band signals into a plurality of subband signals according to special signal frequency resource information of a special signal being transmitted by the communications controller in a manner that reduces or avoids a collision between the full band signal and the special signal, wherein the plurality of subband signals carries information for estimating a channel between the communications controller and a communications device, wherein partitioning the full band signal comprises
   generating a first subband signal from the full band signal spanning a lowest frequency resource of the full band signal to a lowest frequency resource of the special signal;
   generating a second subband signal from the full band signal spanning the lowest frequency resource of the special signal to a highest frequency resource of the special signal; and
   generating a third subband signal from the full band signal spanning the highest frequency resource of the special signal to a highest frequency resource of the full band signal;
   assigning a subband associated with each subband signal in the plurality of subband signals to a respective subband time resource according to special signal time resource information of the special signal in a manner that reduces or avoids a collision between the respective subband signal and the special signal, wherein the assigned subband is part of a plurality of subbands;
   signaling subband frequency resource information and subband time resource information for the plurality of subbands to the communications device; and
   transmitting each subband signal in the plurality of subband signals in its respective subband to the communications device in its respective subband time resource.

2. The method of claim 1, wherein the transmitting occurs at a specified periodicity.

3. The method of claim 1, wherein the special signal comprises a synchronization signal, a broadcast channel, an information block, or a combination thereof.

4. The method of claim 1, wherein the special signal comprises a primary synchronization signal, a secondary synchronization signal, a physical broadcast channel, a dynamic broadcast channel, a system information block, or a combination thereof.

5. The method of claim 1, wherein partitioning the full band signal is in accordance with one or more of the following: minimizing a number of subband signals in the plurality of subband signals, maximizing the number of subband signals in the plurality of subband signals, minimizing a frequency span of each subband signal in the plurality of subband signals, minimizing the frequency span of each subband signal in the plurality of subband signals spanning the special signal, maximizing the frequency span of each subband signal in the plurality of subband signals, or maximizing the frequency span of each subband signal in the plurality of subband signals not spanning the special signal.

6. The method of claim 1, wherein assigning the subband associated with each subband comprises:
   assigning the subband to a first time instance if transmitting the subband in the first time instance does not result in a collision with the special signal; and
   assigning the subband to a second time instance if transmitting the subband in the first time instance does result in a collision with the special signal.

7. The method of claim 1, wherein the communications controller and the communications device are operating in a Third Generation Partnership Project Long Term Evolution compliant communications system configured for time division duplexed operation.

8. The method of claim 1, wherein the full band signal comprises a channel state information reference signal.

9. The method of claim 1, further comprising receiving from the communications device a combined full band measurement in accordance with the transmitted subband signals.

10. A method for operating a user equipment, the method comprising:
receiving, from a communications controller, subband time resource information and subband frequency resource information of a plurality of subbands associated with a plurality of subband signals partitioned from a full band signal selected from a set of orthogonal full band signals, wherein the full band signal is partitioned and the plurality of subband signals are assigned to respective time resources and frequency resources in a manner that reduces or avoids a collision with a special signal;
detecting, for each subband in the plurality of subbands, a transmitted subband signal transmitted in the subband at the respective subband's frequency resource and in the respective subband's time resource, thereby producing a plurality of detected transmitted subband signals;
detecting a newly detected transmitted subband signal in a previously detected subband;
generating full band channel information for a channel between the communications controller and the user equipment according to the plurality of detected transmitted subband signals, wherein generating the full band channel information comprises
estimating the channel according to an updated full band transmitted signal to produce an updated channel estimate, the updated full band transmitted signal comprising the newly detected transmitted subband signal and the plurality of detected transmitted subband signals excluding a previously detected subband signal detected in the previously detected subband; and
generating the full channel information from the updated channel estimate; and
transmitting the full band channel information to the communications controller.

11. The method of claim 10, wherein receiving the subband time resource information and the subband frequency resource information comprises receiving, for each subband in the plurality of subbands, the respective subband's subband time resource information and the respective subband's subband frequency resource information.

12. The method of claim 10, wherein detecting the transmitted subband signal comprises blindly detecting the transmitted subband signal at the respective subband's frequency resource and in the respective subband's time resource.

13. The method of claim 10, wherein generating the full band channel information comprises:
estimating the channel according to a full band transmitted signal comprising the detected subband signals; and
generating the full band channel information from the channel estimate.

14. The method of claim 10, wherein transmitting the full band channel information comprises transmitting a portion of the full band channel information.

15. The method of claim 10, wherein the full band channel information is combined full band channel information.

16. A communications controller comprising:
a processor configured to
partition a full band signal selected from a set of orthogonal full band signals into a plurality of subband signals according to special signal frequency resource information of a special signal being transmitted by the communications controller in a manner that reduces or avoids a collision between the full band signal and the special signal, wherein the plurality of subband signals carries information for estimating a channel between the communications controller and a communications device,
assign a subband associated with each subband signal in the plurality of subband signals to a respective subband time resource according to special signal time resource information of the special signal in a manner that reduces or avoids a collision between the respective subband signal and the special signal, wherein the assigned subband is part of a plurality of subbands,
generate signals for subband frequency resource information and subband time resource information for the plurality of subbands,
generate a first subband signal from the full band signal spanning a lowest frequency resource of the full band signal to a lowest frequency resource of the special signal,
generate a second subband signal from the full band signal spanning the lowest frequency resource of the special signal to a highest frequency resource of the special signal, and
generate a third subband signal from the full band signal spanning the highest frequency resource of the special signal to a highest frequency resource of the full band signal; and
a transmitter coupled to the processor, the transmitter configured to transmit the generated signals to the communications device, and to transmit each subband signal in the plurality of subband signals in its respective subband to the communications device in its respective subband time resource.

17. The communications controller of claim 16, wherein the special signal comprises a primary synchronization signal, a secondary synchronization signal, a physical broadcast channel, a dynamic broadcast channel, a system information block, or a combination thereof.

18. The communications controller of claim 16, wherein the processor is configured to partition the full band signal in accordance with one or more of the following: minimizing a number of subband signals in the plurality of subband signals, maximizing the number of subband signals in the plurality of subband signals, minimizing a frequency span of each subband signal in the plurality of subband signals, minimizing the frequency span of each subband signal in the plurality of subband signals spanning the special signal, maximizing the frequency span of each subband signal in the plurality of subband signals, or maximizing the frequency span of each subband signal in the plurality of subband signals not spanning the special signal.

19. The communications controller of claim 16, wherein the processor is configured to assign the subband to a first time instance if transmitting the subband in the first time instance does not result in a collision with the special signal, and to assign the subband to a second time instance if transmitting the subband in the first time instance does result in a collision with the special signal.

20. The communications controller of claim 16, further comprising a receiver coupled to the processor and configured to receive from the communications device a combined full band measurement in accordance with the transmitted plurality of subband signals.

21. A user equipment comprising:
a receiver configured to receive, from a communications controller, subband time resource information and subband frequency resource information of a plurality of subbands associated with a plurality of subband signals partitioned from a full band signal selected from a set of orthogonal full band signals, wherein the full band signal is partitioned and the plurality of subband signals are assigned to respective time resources and frequency resources in a manner that reduces or avoids a collision with a special signal;

a processor coupled to the receiver, the processor configured to detect, for each subband in the plurality of subbands, a transmitted subband signal transmitted in the subband at the respective subband's frequency resource and in the respective subband's time resource, thereby producing a plurality of detected transmitted subband signals, generate full band channel information for a channel between the communications controller and the user equipment according to the plurality of detected transmitted subband signals, detect a newly detected transmitted subband signal in a previously detected subband, estimate the channel according to an updated full band transmitted signal to produce an updated channel estimate, the updated full band transmitted signal comprising the newly detected transmitted subband signal and the plurality of detected transmitted subband signals excluding a previously detected subband signal detected in the previously detected subband, and generate the full channel information from the updated channel estimate; and a transmitter coupled to the processor, the transmitter configured to transmit the full band channel information to the communications controller.

22. The user equipment of claim 21, wherein the processor is configured to blindly detect the transmitted subband signal at the respective subband's frequency resource and the respective subband's time resource.

23. The user equipment of claim 21, wherein the processor is configured to estimate the channel according to a full band transmitted signal comprising the detected subband signals, and to generate the full band channel information from the channel estimate.

24. The user equipment of claim 21, wherein the transmitter is configured to transmit a portion of the full band channel information.

25. The user equipment of claim 21, wherein the full band channel information is combined full band channel information.

\* \* \* \* \*